Oct. 7, 1947. J. MADER Re. 22,924

DISC MOUNTING

Original Filed Feb. 12, 1945 2 Sheets-Sheet 1

Inventor:
Joseph Mader,
By Lenselman Harby & Lenselman
Attorneys.

Oct. 7, 1947. J. MADER Re. 22,924

DISC MOUNTING

Original Filed Feb. 12, 1945 2 Sheets-Sheet 2

Inventor:

Joseph Mader,

By Cushman Darby & Cushman

Attorneys.

Reissued Oct. 7, 1947

Re. 22,924

UNITED STATES PATENT OFFICE 22,924

DISC MOUNTING

Joseph Mader, Chicago, Ill., assignor to Maremont Automotive Products, Inc., Chicago, Ill., a corporation of Illinois Original No. 2,406,553, dated August 27, 1946, Serial No. 577,420, February 12, 1945. Application for reissue December 23, 1946, Serial No. 717,834

4 Claims. (Cl. 97—217)

The present invention relates to improved means for non-rotatably connecting a member such as a disc, wheel or the like to shafts of different sizes.

An important feature of the invention consists in providing a revoluble member such as a disc or the like with a central opening shaped to receive shafts of different sizes so that the revoluble member may be selectively and non-rotatably connected to either of two shafts.

A further feature of the invention consists in providing a mounting for disc harrows in which each disc is formed with a centrally disposed square opening for non-rotatably receiving a square shaped axle of the same size, and in which the sides of the squared opening are provided intermediate their ends with outwardly extending aligned grooves which form a substantially square socket of a different size than the square opening and are arranged to receive a square axle shaft of the same size as the socket, so that one or more discs may be conveniently fixed to axle shafts of different sizes at a minimum expenditure of time and effort.

Another object is to provide the center portion of a disc adjacent the shaft receiving opening with a reversed curve or annular groove for the purpose of imparting greater flexibility and preventing damage to the disc when in operation.

Other objects and advantages of the invention will become apparent from the following description when taken in conjunction with the accompanying claims and drawings.

Referring to the drawings in which I have shown several preferred embodiments of the invention:

Figure 1:
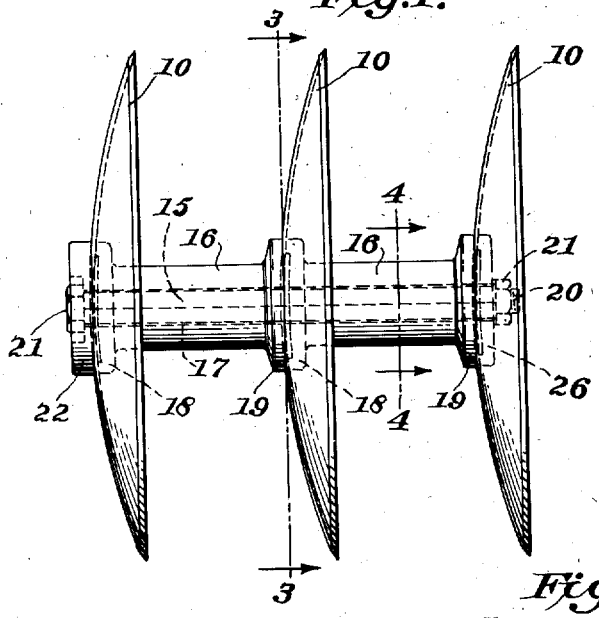
Figure 1 is a side elevation of a disc harrow constructed in accordance with the present invention.
Figure 2:
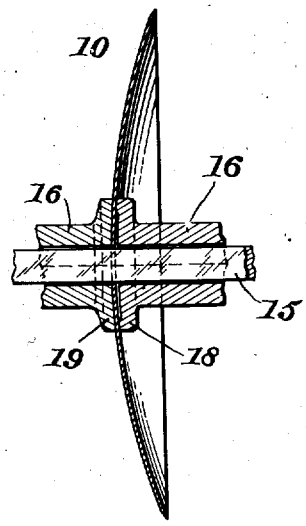
Figure 2 is a vertical sectional view through one of the discs shown in Figure 1.
Figure 5:
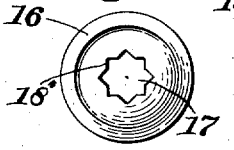
Figure 5 is an end view of one of the spacer sleeves.
Figure 6:
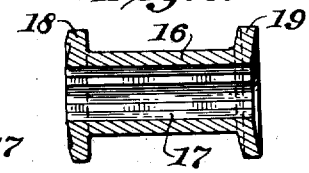
Figure 6 is a longitudinal sectional view of a spacer sleeve.
Figure 3:
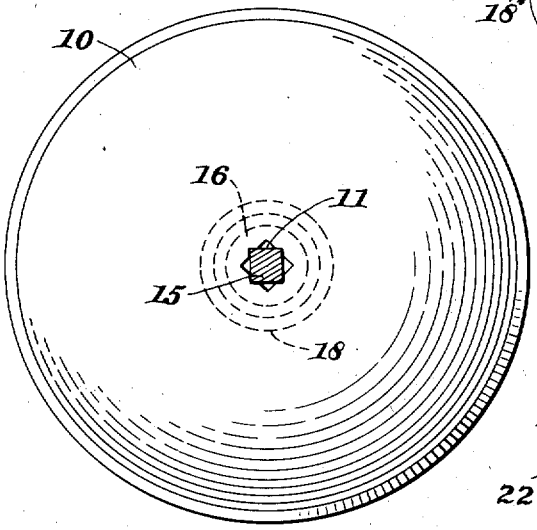
Figure 3 is a sectional view taken substantially along the line 3—3 of Figure 1.
Figure 4:
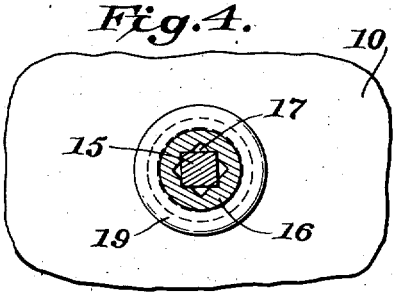
Figure 4 is a detailed sectional view taken substantially along the line 4—4 of Figure 1.
Figure 7:
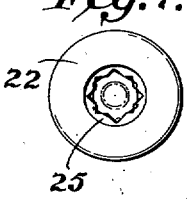
Figure 7 is an end view of the left end washer shown in Figure 1 showing the opening in the washer in full lines and the normal position of one of the retaining nuts indicated in broken lines.
Figure 8:
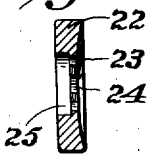
Figure 8 is a vertical sectional view of the washer shown in Figure 7.
Figure 9:
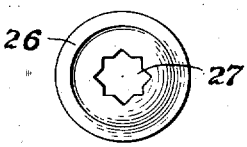
Figure 9 is an end view of the right end washer shown in Figure 1.
Figure 10:
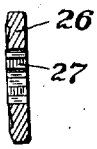
Figure 10 is a vertical sectional view of the washer shown in Figure 9.
Figure 15:
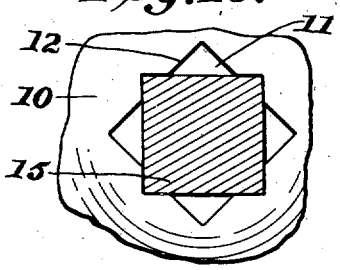
Figure 15 is an enlarged detailed sectional view showing a disc connected to a small size shaft.
Figure 16:
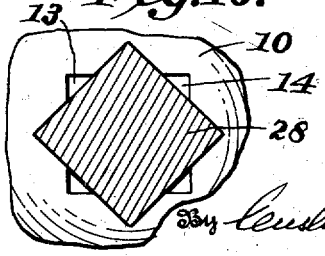
Figure 16 is a view similar to Figure 15 showing the disc connected to a larger size shaft.

Heretofore in the mountings for disc harrows, the square openings in the discs for receiving the supporting shaft or axle were of uniform size and could only be used with a square shaft of the same size. In order to provide means whereby these discs may be detachably secured to square shafts of different sizes, each of the discs 10 of the harrow (Fig. 1) is formed with a substantially square opening 11 (Fig. 15) and each of the sides 12 of the opening intermediate its ends has aligned outwardly disposed V-shaped grooves or recesses 13 which form a square socket 14 of smaller size than the square opening 11. For the purpose of illustration, three transversely curved discs 10 are shown mounted on a square shaft 15 which is substantially the same size as the smaller square socket 14 so that the corners of the shaft interlock with the aligned grooves 13 to positively and non-rotatably connect the discs to the shaft. The discs 10 are uniformly spaced on the shaft 15 by the sleeves or spools 16 each of which is formed with a central square opening 17 similar in construction and size to the opening 11 in the disc, and outwardly extending aligned grooves 18′ which register with and are of the same size as the grooves 13. One end of the sleeve 16 such as 18 is convex so as to bear against the concave portion of the adjacent disc while the opposite end 19 is concave to contact with the complementary curved portion of its adjacent disc. The ends of the shaft 15 are threaded as at 20 to receive the retaining nuts 21. A washer 22 having a curved inner face 23 and a central opening 24 similar in shape to the opening 11 and the socket 14, is arranged to be clamped against the outer left-hand disc 10 by one of the nuts 21. Preferably the outer end of the opening 24 terminates in a recess 25 for receiving the nut 21. A washer 26 has a similar shaped central opening 27 and is held against the concave portion of the adjacent disc 10 by the other nut so that when the parts are set up, the discs are maintained firmly in locked position on the shaft 15. In the event it is desired to use the discs 10 with a different size harrow shaft, this can conveniently be done upon dismantling the discs from the shaft 14 and connecting them to the larger size square shaft 28 (Fig. 16). It will be noted that the shaft 28 is substantially the same size as the square openings 11 in the discs and the openings 17 in the sleeves 16, so as to snugly fit into and engage these openings in order to lock the shaft to the discs and the sleeves. While the improved form of opening has been shown associated with a harrow disc, it will be manifest that the same may with equal efficiency be used for connecting one or more rotatable members to shafts, axles or the like, of different sizes and at a minimum expenditure of time and effort.

Figure 11:
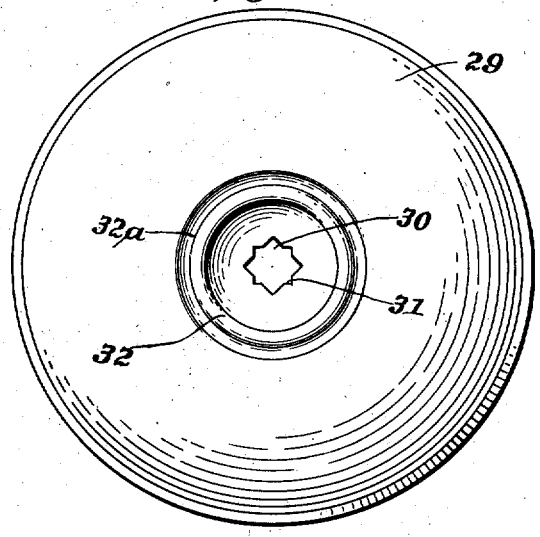
Figure 11 is a front view of a modified form of disc.
Figure 12:
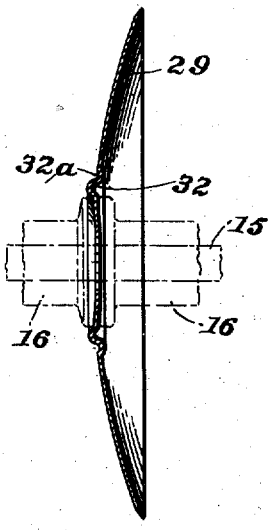
Figure 12 is a vertical edge view of Figure 11.

In the modification shown in Figure 11, the curved disc 29 is provided with a square opening 30, the sides of which intermediate their ends are formed with oppositely aligned grooves 31 so that the disc may receive shafts of different sizes. The disc adjacent the central opening 30 has a reversed curved or annular V-shaped groove 32 on one side and an outwardly spaced V-shaped annular groove **32*a* on its opposite side. These grooves are concentric with the disc and the groove 32*a*** diminishes progressively towards the outer periphery thereof. This arrangement of the grooves imparts gerater flexibility and also guards against fracture or damage of the disc during operation.

Figure 13:
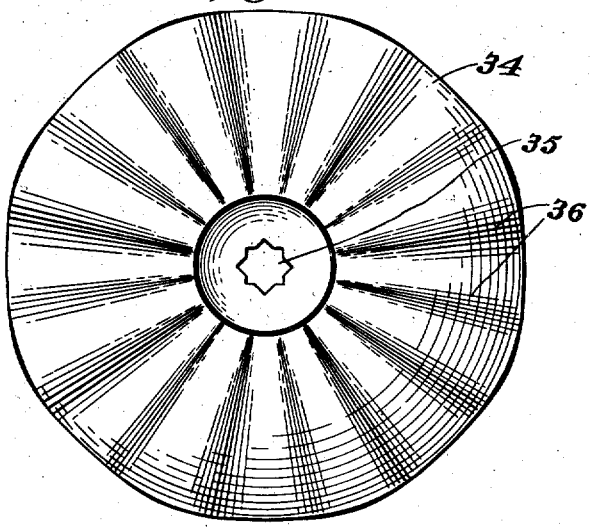
Figure 13 is a front view of a further modified form of disc.
Figure 14:
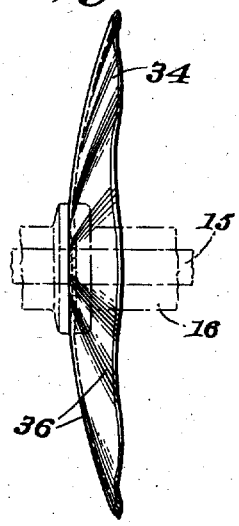
Figure 14 is a vertical sectional view of Figure 13.

In the modification shown in Figure 13, the disc 34 has a central opening 35 shaped to receive shafts of different sizes and may be reinforced by radial corrugations 36 which preferably extend from a point adjacent the central opening to the outer periphery of the disc.

It will be seen that by reason of the particular configuration of the central opening in the disc, that simple, efficient and positive means are provided for connecting either a single disc or a plurality of discs to shafts or the like of different sizes. Thus, the invention is admirably suited for use with disc harrows since not infrequently the manufacturers of such devices provide a ⅞" square shaft for a 16" disc while others use a 1" square shaft for the same size of disc. By arranging the central opening in the disc so as to accommodate a shaft of either size, the same disc can be conveniently connected to a large or small size shaft and thus eliminate the necessity of providing separate discs for each size of shaft.

It will be understood that the forms of the invention shown and described are merely illustrative of preferred embodiments and that such changes may be made as fall within the purview of one skilled in the art without departing from the spirit of the invention and scope of the claims.

I claim:

1. A harrow having a shaft, a plurality of spaced harrow discs carried thereby, spacer members on said shaft for spacing said discs, said discs and spacer members having openings receiving the shaft, said spacer members having means engaging said discs on opposite sides thereof, the walls of the disc openings engaging the shaft to fix the discs thereto for rotary movement, and the walls of said disc openings also having a configuration for mounting on a different sized shaft of greater or less cross section to hold said discs fixed thereon.

2. A harrow having a shaft, a plurality of spaced harrow discs carried thereby, spacer members on said shaft for spacing said discs, said discs and spacer members having openings receiving the shaft, the walls of said openings engaging the shaft to fix the discs and spacers thereto for rotary movement together, and the walls of said openings also having a configuration for mounting on a different sized shaft of greater or less cross section to hold the said discs and spacer fixed thereon.

3. A harrow having a shaft which is polygonal in cross section, a plurality of spaced harrow discs carried thereby, spacer members on said shaft for spacing said discs, said discs and spacer members having polygonal openings receiving the shaft, the walls of said openings engaging the shaft to fix the discs and spacers thereto for rotary movement together, and the walls of said openings also having a configuration for mounting on a different sized shaft of greater or less cross section to hold the said discs and spacers fixed thereon.

4. For use in a harrow having a shaft which is polygonal in cross section and adapted to receive harrow discs thereon for rotation with the shaft, a concavo-convex earth-engaging harrow disc having formed out of its central portion a concentric opening extending entirely through the disc, the walls of the opening defining a plurality of concentric polygonal shaft-receiving openings of different size for interchangeably receiving harrow shafts of different polygonal cross sections corresponding to the size of said openings.

JOSEPH MADER.

REFERENCES CITED

The following references are of record in the file of this patent:

UNITED STATES PATENTS

| Number | Name | Date |
|---|---|---|
| 323,343 | La Dow | July 28, 1885 |
| 437,124 | La Dow | Sept. 23, 1890 |
| 451,421 | La Dow | Apr. 28, 1891 |
| 629,243 | Jaeger | Dec. 19, 1899 |
| 792,761 | Duncon | June 20, 1905 |
| 1,512,702 | McCarty | Oct. 21, 1924 |
| 1,936,109 | Frank | Nov. 21, 1933 |
| 2,168,072 | Rumely | Aug. 1, 1939 |